United States Patent [19]

Takimoto

[11] 4,318,596
[45] Mar. 9, 1982

[54] SOUND MOTION PICTURE CAMERA

[75] Inventor: Hiroyuki Takimoto, Urawa, Japan

[73] Assignee: Canon Kabushiki Kaisha, Tokyo, Japan

[21] Appl. No.: 71,545

[22] Filed: Aug. 31, 1979

[30] Foreign Application Priority Data

Sep. 8, 1978 [JP] Japan ................................ 53-111067
Sep. 29, 1978 [JP] Japan ................................ 53-120487

[51] Int. Cl.³ .............................................. G03B 31/00
[52] U.S. Cl. ......................................... 352/14; 352/22
[58] Field of Search .................... 352/14, 21, 22, 180

[56] References Cited

U.S. PATENT DOCUMENTS 2,982,172  5/1961  Berkenhoff ........................... 352/14
4,000,496 12/1976  Beaulieu ............................... 352/14

Primary Examiner—Monroe H. Hayes
Attorney, Agent, or Firm—Toren, McGeady & Stanger

[57] ABSTRACT

In the camera disclosed, the film loop between the film drive at an exposure aperture and the film drive at a sound recording station is sensed and the film is prevented from jamming by having a drive unit operate a film drive motor at the exposure aperture and a capstan motor at the sound recording station operate simultaneously only when the film loop is sufficiently small to prevent jamming, but by operating only the capstan motor, and delaying the film motor when the loop is too long.

4 Claims, 18 Drawing Figures

FIG.1
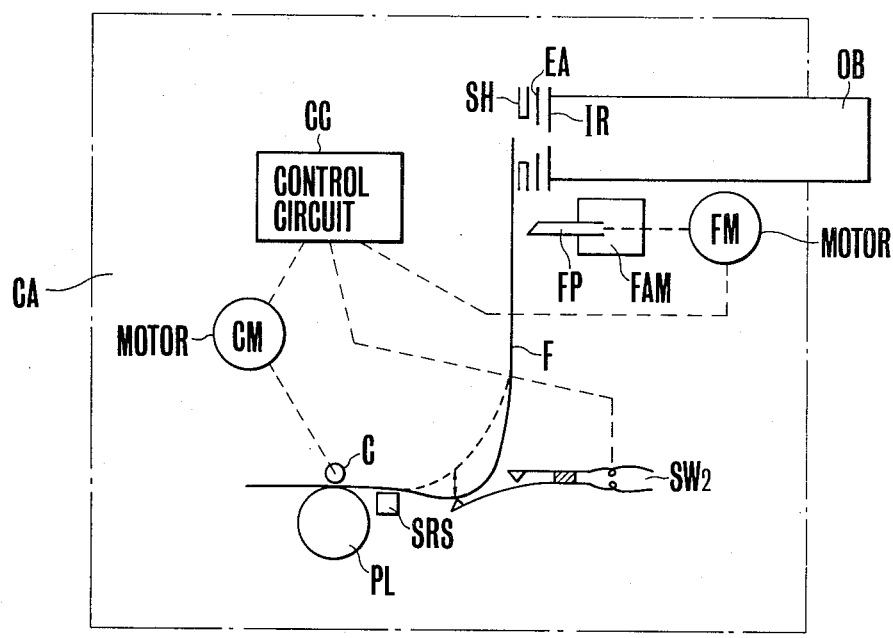
FIG.3a
FIG.3b
FIG.3c
FIG.3d
FIG.3e
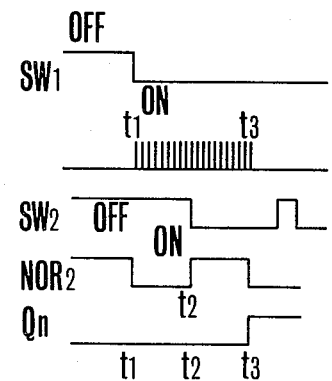

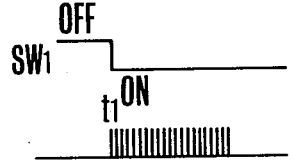
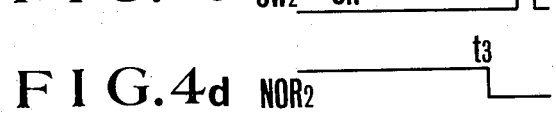
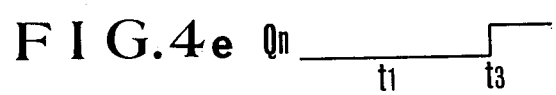
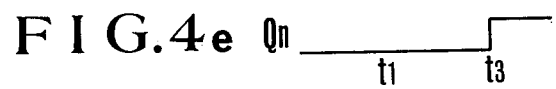
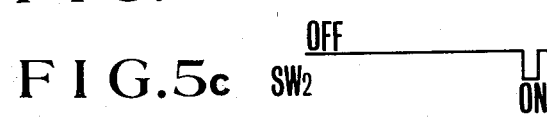
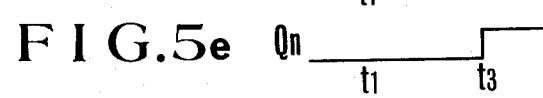

SOUND MOTION PICTURE CAMERA

BACKGROUND OF THE INVENTION

This invention relates to sound motion picture cameras, and particularly, to sound motion picture cameras in which a film motor drives film past an exposure aperture and a capstan motor drives the film past a sound recording station.

Motion picture cameras generally form a film loop of predetermined length between a film advancing mechanism at the exposure aperture and a capstan mechanism at the sound recording station as the film strip is fed from a supply to a takeup spool. When the capstan motor at the capstan mechanism and the film motor in the film mechanism operate simultaneously in response to a release, there is a great possibility of creating an unduly large slack in the film strip between the capstan and the film advancing mechanism, usually in the form of a pull-down mechanism, which could lead to jamming of the film strip.

To avoid this, prior art cameras have devices to drive the capstan motor first so as to regulate the length of the looped film strip, and then drive the film motor only after the film strip has been shortened. This prevents jamming of the film strip. However, in this type of sound motion picture camera, because driving of the capstan motor always precedes initiation of the intermittent advancement of the film strip past the exposure aperture, even when a film cartridge is inserted into the camera with a correct predetermined loop length, the capstan motor may pull the film strip and displace the normal picture frame from alignment with the exposure aperture prior to exposure. Upon reproduction, an image flow may occur at the first picture frame.

To prevent this, attempts have been made to hold the film stationary in the normal position by increasing the force of the side pressure plates in the film advancing mechanism so that they can resist the capstan mechanism. However, this requires increasing the force of advancing the film past the exposure aperture and results in disadvantageous increase in the consumption of electrical energy by the film motor. Moreover, the side pressure plates tend to press the film laterally and the film may distort to the point where the sharpness of the images decreases. Another disadvantage arises from the fact that adjusting the operation of the side pressure plates to an ideal or design value is time consuming and troublesome. This increases production costs. As a further point, this method must permit the pinch roller and the capstan which sandwich the film to slip. Hence, the possibility of scratching the film may increase and, at the same time, the film drive by the pinch roller and capstan may be adversely affected.

SUMMARY OF THE INVENTION

An object of the present invention is to provide a sound motion picture camera which overcomes the aforementioned disadvantages.

According to a feature of the invention, the operation of the capstan and film motors is initiated by driving the capstan motor before initiation of exposure only when the length of the looped film is longer than a predetermined length, while driving the film motor and capstan motor simultaneously when the length of the looped film is equal to or smaller than the predetermined length.

Another object of the present invention is to provide a sound motion picture camera in which, when the length of the looped film is longer than a predetermined length, driving of the film motor is initiated a predetermined time after the capstan motor has been started, while when the film loop is shorter than the predetermined length, the capstan motor and film motor are driven simultaneously.

Still another object of the present invention is to provide a sound motion picture camera with automatic means for detecting the excess of slack of the film beyond the predetermined length to stop the film motor from continuing until the length of the film loop as detected by the sensing means reaches the predetermined length.

BRIEF DESCRIPTION OF THE DRAWINGS

FIG. 1 is a schematic view of a camera with a capstan mechanism and a film advancing mechanism embodying features of the invention.

FIGS. 3a to 5e are waveforms showing the manner in which the circuit of FIG. 2 operates.

DESCRIPTION OF PREFERRED EMBODIMENTS

In FIG. 1, a film F forms a loop between an exposure aperture EA and a sound recording station SRS in a camera CA. The film F may emerge from and reenter a cartridge or cassette, not shown, removably mounted in the camera CA. A capstan motor CM drives a capstan C against which a pinch roller PL presses the sound film F. The motor CM always rotates the capstan C at a constant speed, so that the film F is continuously transported past the sound recording station SRS near the capstan C. A film drive motor FM is connected to a known film advancing mechanism FAM having a pull-down claw FP. The claw FP advances the film F intermittently, past the exposure aperture EA formed at an objective OB and a shutter SH as well as an iris IR, one frame for each claw operating cycle by engaging perforations in the film during the first half of each cycle. A loop sensor switch SW2 opens and closes, depending upon the amount of slack in the film F. More specifically, when the length of the film loop, or looped film is longer than a predetermined length as shown by the solid line, the switch SW2 is opened. When the slack is reduced and the loop is shorter, as shown by the dashed or broken line, the switch SW2 is closed.

Figure 2:
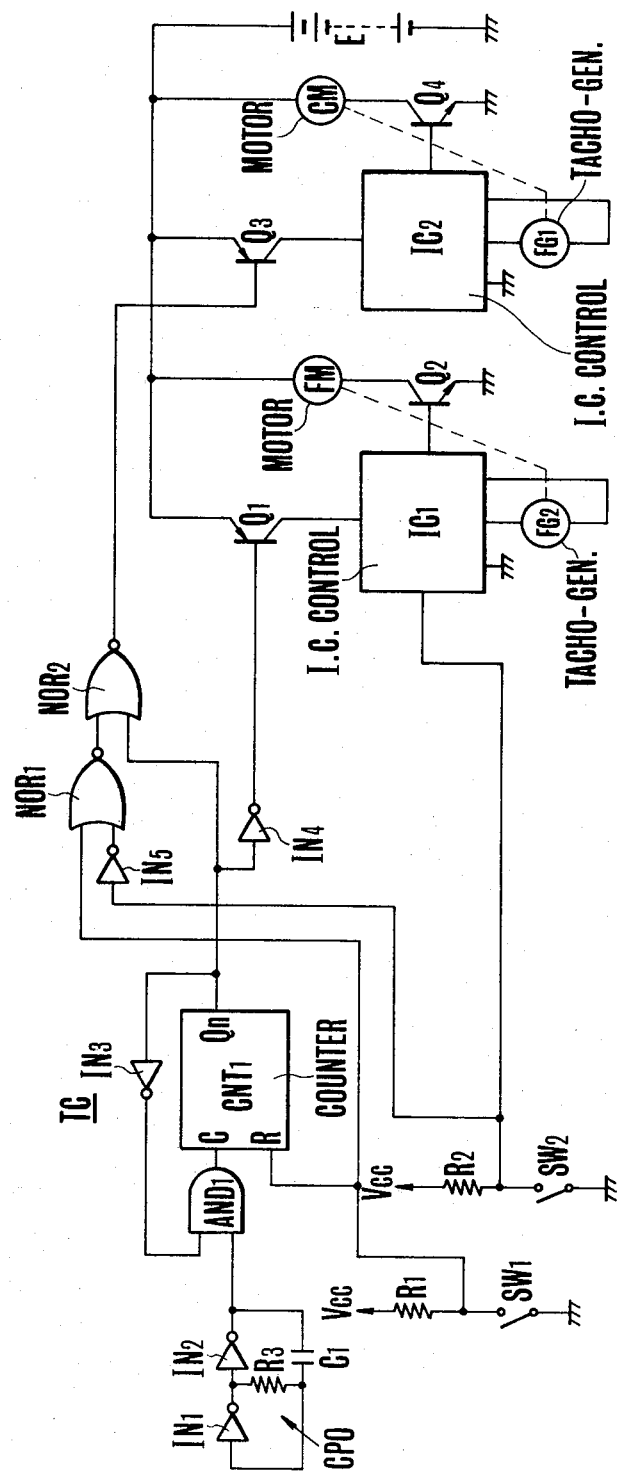
FIG. 2 is an electrical circuit diagram of a motor control circuit in FIG. 1 embodying features of the invention.

The capstan motor CM and the film motor FM of FIG. 1 are controlled by a control circuit CC whose details are shown in FIG. 2. In FIG. 2, a release switch SW1 cooperates with a release lever (not shown) for operating the camera and, when closed, grounds a resistor R1 connected in series therewith and to a voltage Vcc. The junction of the switch SW1 and the resistor R1 is connected to the reset input R of a binary counter CNT1, so that when the switch SW1 is closed, the counter CNT1 is reset. The switch SW2 of FIG. 1 is connected in series with a resistor R2. Two inverters IN1 and IN2, a resistor R3 and a capacitor C1 form a clock pulse oscillator CPO. An AND gate AND1 with two inputs has one of its inputs connected to the output of the clock pulse oscillator CPO and the other of its inputs connected to the output of an inverter IN3. The counter CNT1, with its clock terminal C connected to the output of the AND gate AND1, counts the clock pulses from the clock pulse oscillator CPO through the AND gate AND1. When the number of pulses counted reaches a predetermined value, the output terminal Qn of the counter CNT1 produces a high signal. The inverter IN3 connected between the output terminal Qn1 of the counter CNT1 and the input terminal of the AND gate AND1 inverts this high signal and disables the AND gate AND1. Prior to reaching the predetermined level, the counter CNT1 produces a low signal at its output Qn and the inverter IN3 enables the AND gate AND1 with a high input voltage. The parts AND1, IN3 and CNT1 form a timer circuit TC.

An inverter IN5 receives the voltage at the junction of the resistor R2 and the switch SW2, and when the switch is open supplies a low voltage to a NOR gate NOR1. When the switch SW2 is closed, the inverter IN5 receives a low voltage and applies a high voltage to the NOR gate NOR1. Hence, the inverter IN5 serves to change the output of the NOR gate NOR1 to a low level when the switch SW2 is turned on.

The other input of the NOR gate NOR1 is connected to the junction between the switch SW1 and the resistor R1, so that when the switch SW1 is turned off, the NOR gate produces a low output. In effect, the NOR gate NOR1 produces a high output only if the switch SW1 is on and the switch SW2 is off. It produces a "0" either if the switch SW1 is off or the switch SW2 is on.

A NOR gate NOR2 with one input connected to the output of the NOR gate NOR1 and its other input connected to the output Qn of the counter CNT1. The output of the NOR gate NOR2 is connected to the base of a transistor Q3. An inverter IN4 inverts the output Qn of the counter CNT1 and applies it to the base of a PNP transistor Q1. Hence, it renders the transistor Q1 nonconductive when the output Qn is low, and renders the transistor Q1 conductive when the output Qn is high.

The transistor Q3 controls the power supplied to an integrated circuit IC2 which controls the speed of the capstan motor CM. The speed control IC2 controls the on/off operation of an electrical power supply control transistor Q4 on the basis of the output of a tacho-generator TG1 which causes the motor CM to rotate at a given speed of 18 frames per second.

The transistor Q1 controls the electrical power supply to an integrated circuit IC1 which controls the speed of the film motor FM. The integrated circuit IC1 is connected to the sensor switch SW2 and to a tacho-generator TG2 that cooperates with the film motor FM so as to control the speed of the film motor FM.

An electrical power supply control transistor Q2 has its on and off operation controlled by the output of the integrated circuit IC1 so that when the switch SW2 is turned off, the speed of the motor is reduced to 16 frames per second, while when the switch SW2 is turned on, the speed of the motor is increased to 20 frames per second. The entire system is energized by an electrical power source or battery E. The integrated circuits (IC's) IC1 and IC2 are available from Hitachi Ltd. under the model number or trade name HA16503.

In operation, a sound film cartridge is inserted into and seated in a chamber of the camera housing while permitting the film to be slack as shown by the solid curve in FIG. 1. When the release lever (not shown) is depressed, the switch SW1 is turned on. Hence, the potential at the junction of resistor R1 and the switch SW1 is low at the time $t_1$ at which the release lever is depressed. This appears in FIG. 3a. This resets the counter CNT1 and enables it to count the clock pulses CP from the oscillator as shown in FIG. 3b. It should be noted that in this reset condition, the output Qn is low so that the inverter IN3 enables the AND gate AND1 to pass the pulses to the clock pulse input of the counter CNT1, and hence, permits the counter CNT1 to count the pulses.

The low signal level is also fed to the NOR gate NOR1. Since, as mentioned, the film is looped as shown by the solid line in FIG. 1, i.e., to a length longer than the predetermined length, the switch SW2 is turned off as shown in FIG. 1. Hence, the potential at the junction of the resistor R2 and the switch SW2 is high at the time $t_1$ as shown in FIG. 3c. Because the switch SW1 is closed, it produces a low potential, and the switch SW2 is open so that its high potential becomes low at the input of NOR gate NOR1, the output of NOR gate NOR1 is high at the time $t_1$.

The resulting high input to the NOR gate NOR2 produces a low level signal at its output as shown in FIG. 3d. This renders the transistor Q3 conductive at the time $t_1$ and results in actuation of the speed control integrated circuit IC2 so that the latter turns on the transistor Q4 and starts the capstan motor CM. Since the capstan C is connected to the capstan motor CM, rotation of the capstan motor CM starts rotation of the capstan C. Accordingly, soon after actuation of the release, the film F is driven by the capstan C.

As the film F moves, the slack formed in the film is gradually reduced. When the film loop becomes sufficiently short, the switch SW2 is turned on. This may be assumed to occur at the time $t_2$. The potential of the junction of the switch SW2 and the resistor R2 is then switched to a low level at the time $t_2$ of FIG. 3c. Therefore, the output of the inverter IN5 goes high and the output of the NOR gate NOR1 to the NOR gate NOR2 goes low. On the other hand, because the counter CNT1 has started to count at the time $t_1$ of the actuation of the release, as mentioned, the output Qn remains low at the time $t_2$ because the number of pulses counted has not yet reached the predetermined value as shown in FIG. 3e. Hence, the other input to the NOR gate NOR2 remains low. Therefore, changing the output of the NOR gate NOR1 to a low at the time $t_2$ changes the output of the NOR gate NOR2 to a high, as shown in FIG. 3d. This renders the transistor Q3 nonconductive at the time $t_2$ and causes the capstan motor CM to stop its rotation. This, therefore, stops film transport of the capstan C.

In this manner, the capstan motor CM rotates until the length of the looped film is reduced to a predetermined value and its rotation is stopped when the normal loop of film is established. It will be appreciated that there is no possibility of transporting the film with the capstan until the length of the looped film becomes shorter than a predetermined value. This prevents the image shift at the exposure aperture which would otherwise occur due to the film being fed more than necessary.

After the length of looped film has been regulated accurately to the predetermined value in this manner, the rotation of the capstan motor has stopped, the counter CNT1 keeps counting. When the content of the counter CNT1 reaches a predetermined number at a time $t_3$, the output terminal Qn of the counter CNT1 produces a high signal as shown in FIG. 3e. NOR gate NOR2 responds to any high signal by going low again as shown in FIG. 3d. This again turns on the transistor Q3. The capstan motor CM then again starts to rotate at the time $t_3$ and the film F is driven by the capstan C.

On the other hand, the high signal at the output terminal Qn of the counter CNT1 causes the inverter IN4 to render the transistor Q1 conductive at the time $t_3$. This supplies electrical power to the speed control integrated circuit IC1. Thus, the film motor FM also starts to rotate at the time $t_3$, and intermittent advancement of the film is initiated. After the time $t_3$, therefore, the film motor and the capstan motor rotate in synchronism while the operator takes a picture and records sound.

Effectively, the high at the output Qn of the counter CNT1 always produces the lows at the bases of transistors Q1 and Q3 to maintain power at the integrated circuits IC1 and IC2.

It is also possible that the film cartridge may be loaded in the camera with the loop of film being sufficiently short to follow the broken curve of FIG. 1. In that case, the switch SW2 is on before the release is actuated. The potential at the junction of the switch SW2 and the resistor R2 appears low at and before the time $t_1$ as shown in FIG. 4c. The high signal produced by the inverter IN5 at the input to the NOR gate NOR1 produces a low at the output of NOR gate NOR1 and the latter is unaffected by the switch SW1. For this reason, even when the switch SW1 is turned on by operating the release lever to change the potential at the junction of the switch SW1 and the resistor R1 to a low level at the time $t_1$ as shown in FIG. 4a, the NOR gate NOR1 continues to produce a low level signal. This low level signal permits the NOR gate NOR2 to respond to the low level signal before and after the time $t_1$ at the output Qn. Hence, the NOR gate NOR2 produces a high output at the time $t_1$ as shown in FIG. 4d.

As a result of the above, the transistor Q3 remains nonconductive. Thus, actuation of the release does not result in driving of the capstan motor CM. This situation continues until the counter CNT1 has counted the predetermined number of pulses from the clock pulse oscillator CPO and produces a high level signal which reverses the NOR gate NOR2, reverses the output of inverter IN4, and renders transistors Q1 and Q3 conductive at the time $t_3$ in FIG. 4e. The NOR gate NOR2 produces this low level signal for the first time at the time $t_3$. This results in the capstan motor rotating.

At the same time, conduction of transistor Q1 as a result of the high at the output terminal Qn of the counter CNT1 causes the film motor FM to start operating in the same manner as described in connection with FIG. 3 and at the time $t_3$ at which the counter CNT1 produces the high level signal at its output terminal Qn.

It will be understood that with the camera having the film properly threaded through the channels, picture taking operation is immediately initiated without recourse to control and adjustment of the film loop. This prevents slipping of the picture frame because no excessive tension is imparted to the film between the exposure aperture and sound recording station.

It is possible that the length of the looped film during insertion into the camera is too long to reach the predetermined length during the time that the counter CNT1 produces the high level signal from the output terminal Qn. The switch SW2 then remains open to permit termination of the preliminary rotation of the capstan motor to be deferred beyond the actuation of the release. The operation of the circuit is then shown in FIGS. 5a to 5e. That is, in this case, the potential at the junction of the switch SW2 and the resistor R2 continue to be effective as a high level signal as shown in FIG. 5c. Therefore, after closure of the switch SW1 by actuation of the release, the NOR gate NOR1 continues to produce a high level signal. Therefore, the output of the NOR gate NOR2 also continues to produce a low level signal after the time $t_1$ of actuation as shown in FIG. 5d. Thus, the capstan motor also continues to rotate after the actuation of the release. On the other hand, the film motor FM is driven for rotation at the time $t_3$ at which the counter CNT1 has counted the predetermined number of pulses to produce the high level signal from the output terminal Qn. In this case, after actuation of the release, the capstan motor rotates, and after that the film motor starts to rotate to carry out the picture taking operation.

It will be seen from the foregoing that the drive control circuit for the sound motion picture camera of the present invention serves to drive the capstan motor prior to initiating the picture taking operation when the film loaded in the camera forms a loop longer than a predetermined length, and when the loop is shorter than the predetermined length, the film motor and capstan motor are simultaneously driven to prevent jamming of the film and even shifting of the first picture frame in a scene.

Figure 6:
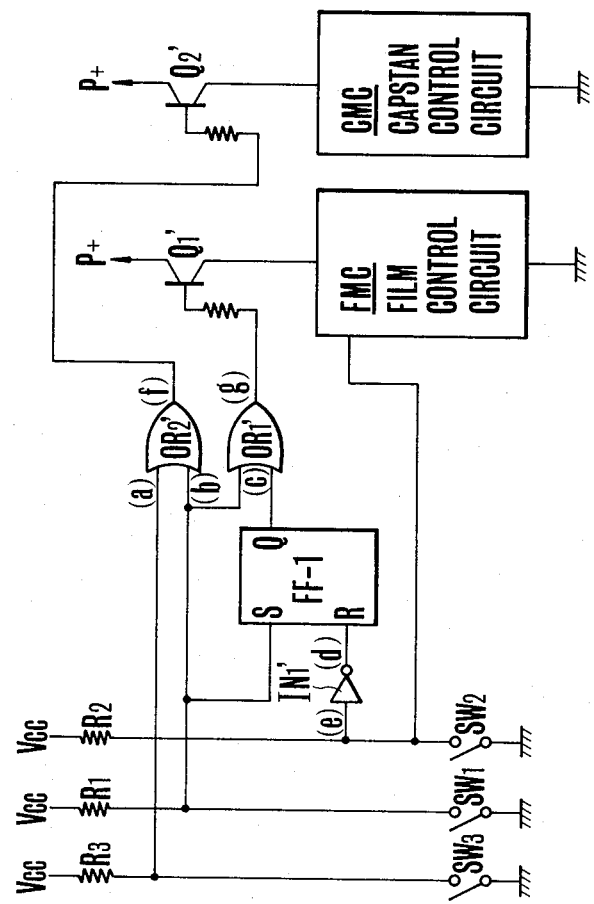
FIG. 6 is an electrical circuit diagram showing another motor control embodying features of the invention.

FIG. 6 shows another embodiment of the circuitry of a sound motion picture camera according to the present invention. Here, a sensor switch SW3 determines whether a film cartridge contains a sound film or a silent film. When a sound film cartridge is inserted into the camera, the switch SW3 is turned on. A release switch SW1 responds to actuation of a release, and a switch SW2 corresponds to the loop sensor switch SW2 shown in FIG. 1.

An RS Flip-Flop FF1 has its set input connected to the switch SW1 and its reset input connected through an inverter IN1' to the switch SW2. Two input OR gates OR1' and OR2' control two transistors Q1' and Q2' which control the electrical power to a film control circuit FMC for the film motor FM of FIG. 1 and a capstan motor control circuit CMC for the capstan motor CM of FIG. 1, respectively. The circuit FMC is constructed of an integrated circuit IC1, a transistor Q2, a tacho-generator TG2 and the film motor FM as described in connection with FIG. 2. The circuit CMC is constructed of an integrated circuit IC2, a transistor Q4, a tacho-generator TG1 and a capstan motor CM as described in connection with FIG. 2.

Resistors R1 and R2 connect switches SW1 and SW2 to a voltage Vcc as in FIG. 2. A resistor R3 also connects the switch SW3 to the voltage Vcc.

Now let us assume that the sound film cartridge is loaded in the camera, and the film loop is slack along the path shown by the solid line curve in FIG. 1. The sound cartridge sensor switch SW3 is then on, and the loop sensor switch SW2 is off. Before the release is actuated, the release switch SW1 is open so that the one input (b) of the OR gate OR2' is high, and the input S of the Flip-Flop FF1 is also high. At this time, the inverter IN1 causes the high signal at the open switch SW2 to appear as a low at the input R of the Flip-Flop FF1, and the output Q of the FF1 is high. Therefore, the input (c) of the OR1' is also high. Since the common input (b) of the OR gates OR1' and OR2' is high, both of the OR gates OR1' and OR2' produce high outputs (f) and (g). Hence, the PNP transistors Q1' and Q2' are both rendered nonconductive. Therefore, the control circuits FMC and CMC do not yet actuate the two motors FM and CM.

When the release switch SW1 is turned on by actuation of the release, the input (b) of the OR1' and OR2' is changed to low so that while the output (g) of the OR gate OR1' remains high, the output (f) of the OR gate OR2' is changed from high to low. At the same time the release is actuated, transistor Q2' is turned on to energize the capstan motor CM. Since, at this time, the output of R gate OR1' is high, and the transistor Q1' is in the nonconductive state, the film motor FM remains stationary to allow rapid reduction of the length of film loop.

When the loop sensor switch SW2 changes from off to on in response to a shortened loop, the output (d) of the inverter IN1' becomes high. The high level output inverts the RS Flip-Flop FF1 and produces a low at the Q output and input (c) thereby causing the output (g) of the OR1' to change to a low level. Thus, the film motor FM is energized by the transistor Q1' and the control circuit FMC and starts to rotate, while the film loop is simultaneously maintained at the predetermined length with the utmost accuracy during the picture taking and sound recording operation.

When the release switch SW1 is turned off, the outputs (g) and (f) of the OR gates OR1' are both changed to high levels which stop the capstan motor CM and the film motor FM simultaneously. If the loop sensor switch SW2 remains on at this time, both inputs S and R of the Flip-Flop FF1 become high, and the output Q is uncertain. However, at this time, the switch SW1 is turned off and the input (b) of OR1' is high. Thus, the output (g) of OR gate OR1' is high. Thus, no problem is encountered.

When the release switch SW1 is closed again, the output (f) of OR2' becomes low as mentioned so that the capstan motor CM is immediately driven. If the film loop of predetermined length exits at this time, as shown by the dashed line curve in FIG. 1, the loop sensor switch SW2 is closed. Thus, the R input (d) of FF1 is changed to a high level. Since the S input is low, the Q output of FF1 is changed to a low level at which time, the film motor is also immediately driven.

With a silent film cartridge loaded into the camera, the switch SW3 remains off. Thus, the output (f) of the gate OR2' is changed to a high level despite the closure of the release switch SW1. This prevents the capstan motor CM from being driven. When the release switch SW1 is now turned on, and the loop sensor switch SW2 is on, the Q output of Flip-Flop FF1 is changed to a low level. The output (g) of the gate OR1' goes low, and thus, only the film motor FM is rotatably driven to perform its picture taking operation.

As has been described in detail above, the sound motion picture camera of the present invention includes means for deferring the actuation of a film motor pending completion of the adjusting of the film loop to the predetermined length. This prevents jamming of the film, and further, even the first picture frame in a continuous succession of still picture frames can be accurately aligned with the exposure aperture.

While embodiments of the present invention have been described in detail, it will be evident to those skilled in the art that the invention may be embodied otherwise without department from its spirit and scope. For example, the switch SW2 may be set to turn off for a correct loop length and turn on for an excess loop length. The remaining circuit can be adjusted with suitable inverters.

What is claimed is:

1. A motion picture camera capable of recording sound along with recording images, comprising:
   (a) detecting means for detecting the length of looped film;
   (b) an actuable release;
   (c) a film motor;
   (d) a capstan motor;
   (e) a timer circuit coupled to the release for operating in response to actuation of the release and for producing an output after a predetermined time is counted;
   (f) a film motor drive circuit coupled to said timer circuit for initiating operation of said film motor in response to said timer circuit;
   (g) a capstan motor drive circuit coupled to the capstan motor for initiating operation of said capstan motor in response to the output of said timer circuit when said detecting means detects that the loop length is shorter than a predetermined value and for initiating operation of said capstan motor independently of the output of said timer circuit when the detecting means detects that the loop length is longer than the predetermined value.

2. A device as in claim 1, wherein said detecting means produces a first output when the loop length is longer than a predetermined value, and a second output when the loop length is shorter than the predetermined value, and said capstan motor drive circuit responds to said first output and the output of said timer circuit independently of each other to drive said capstan motor.

3. A motion picture camera capable of recording sound along with images, comprising:
   (a) detecting means for producing a first signal when the length of looped film is longer than a predetermined value, and a second signal when shorter than the predetermined value;
   (b) a release;
   (c) a timer circuit coupled to said release for operating in response to actuation of said release, and for producing an output when a predetermined time is counted;
   (d) a film motor drive circuit coupled to said timer circuit for driving a film motor in response to the output of the timer circuit;
   (e) a capstan motor drive circuit coupled to the detecting means for responding to said first signal for driving said capstan motor and for terminating the drive of said capstan motor in response to said second signal, and for responding to the output of said timer circuit independently of said first and said second signals driving said capstan motor.

4. A motion picture camera capable of recording sound along with recording images, comprising:
   (a) detecting means for detecting the length of looped film;
   (b) a film motor;
   (c) a capstan motor;
   (d) a releasable control circuit coupled to said detecting means as well as to said film motor and said capstan motor for driving first the capstan motor and then the film motor when the loop length detected by said detecting means is longer than a predetermined value, and for driving said capstan motor and said film motor simultaneously when the detecting means detects that the loop length is shorter than the predetermined value;

said control circuit having a timer circuit, and said control circuit being arranged to actuate said film motor at a time regulated by said timer circuit after the drive of said capstan motor when said detecting means detects that the loop length is longer than the predetermined value.

* * * * *